Sept. 18, 1951           C. E. BARKIS           2,568,480
POWER DISTRIBUTION SYSTEM
Filed Aug. 14, 1946           4 Sheets-Sheet 1
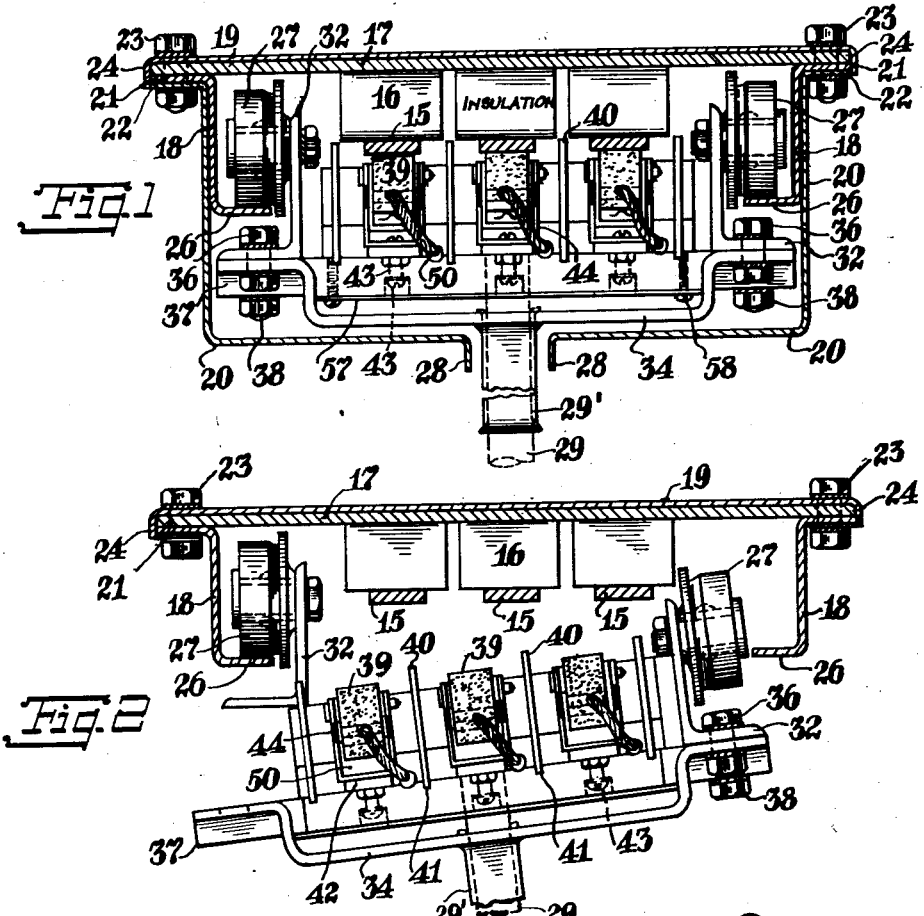
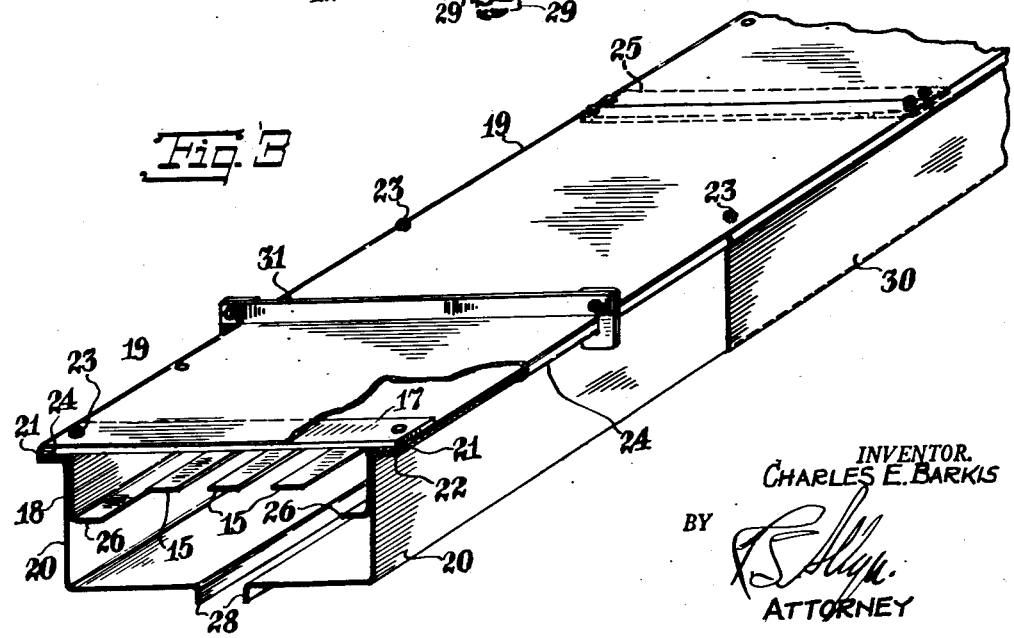
INVENTOR.
CHARLES E. BARKIS
BY
ATTORNEY Sept. 18, 1951  C. E. BARKIS  2,568,480
POWER DISTRIBUTION SYSTEM
Filed Aug. 14, 1946  4 Sheets—Sheet 2
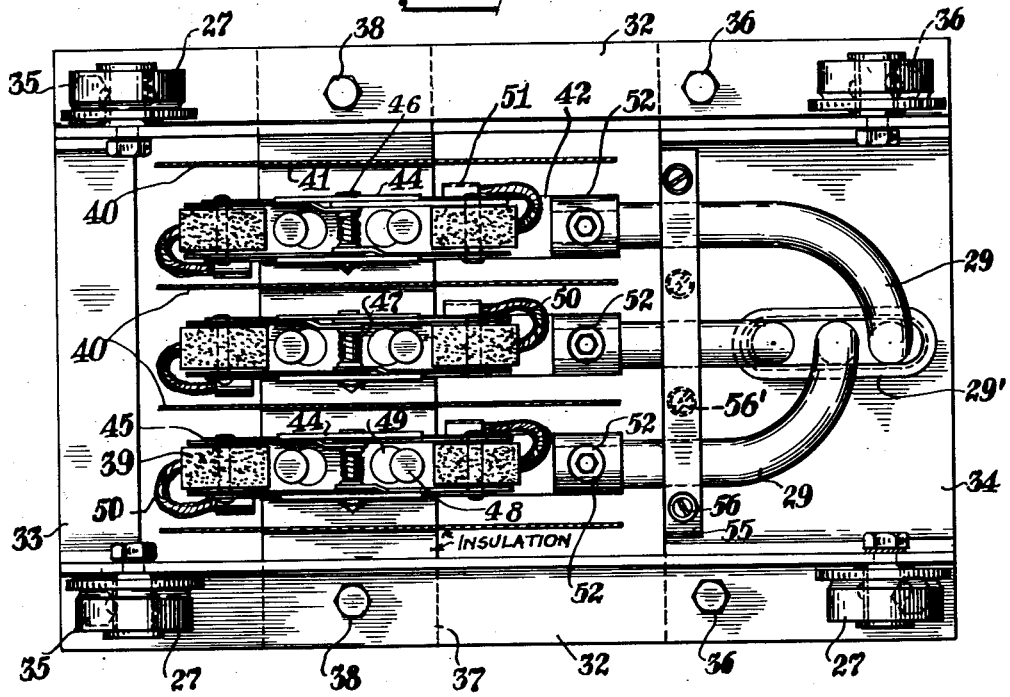
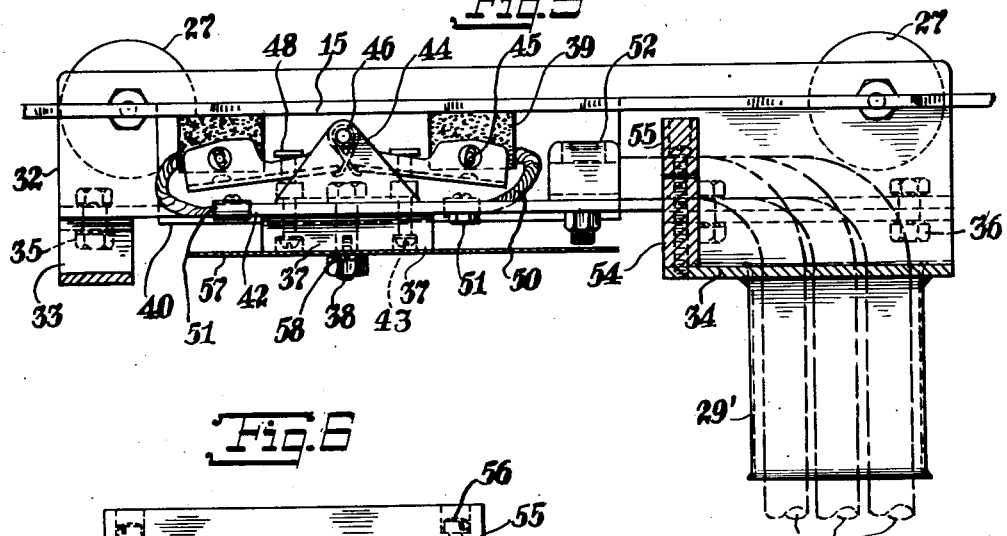
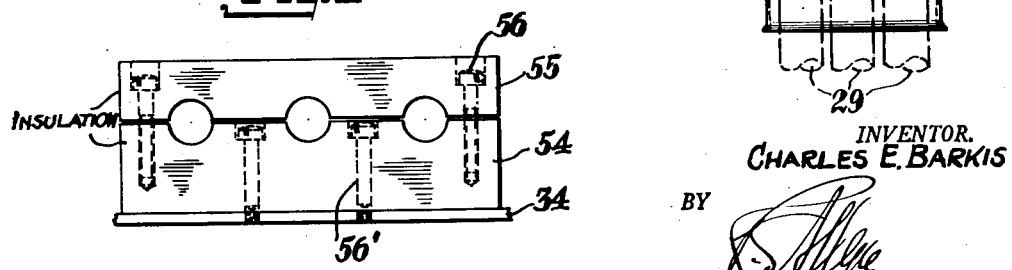
INVENTOR.
CHARLES E. BARKIS
BY
ATTORNEY

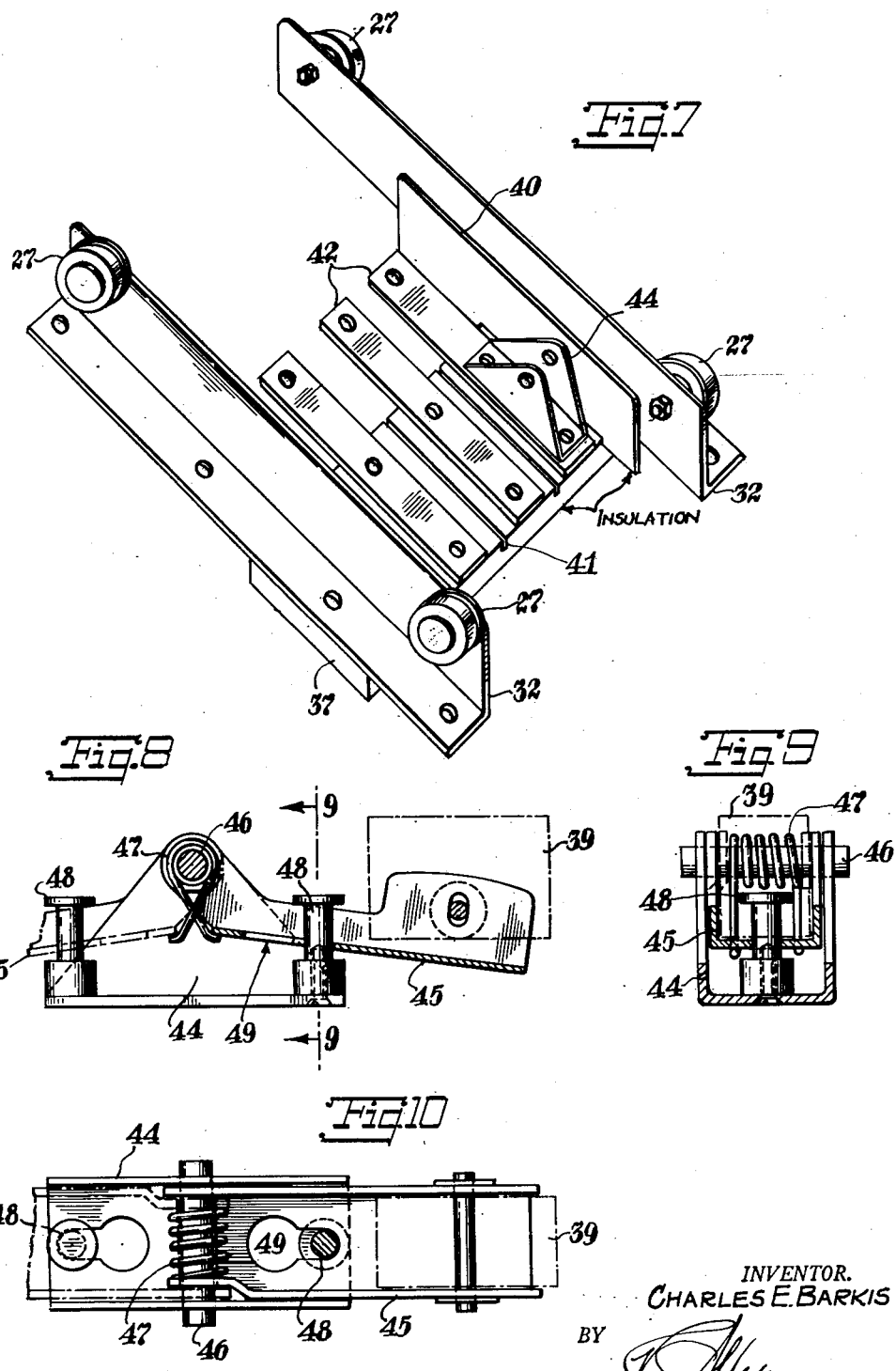

Sept. 18, 1951 — C. E. BARKIS — 2,568,480
POWER DISTRIBUTION SYSTEM
Filed Aug. 14, 1946 — 4 Sheets-Sheet 4
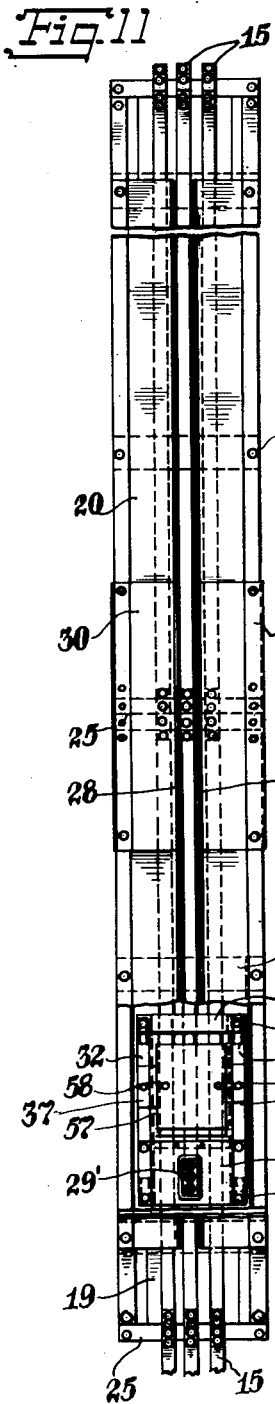
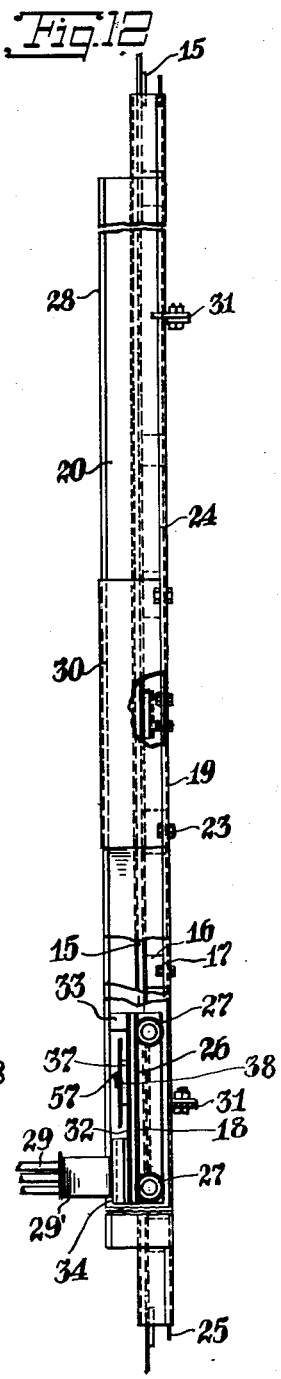
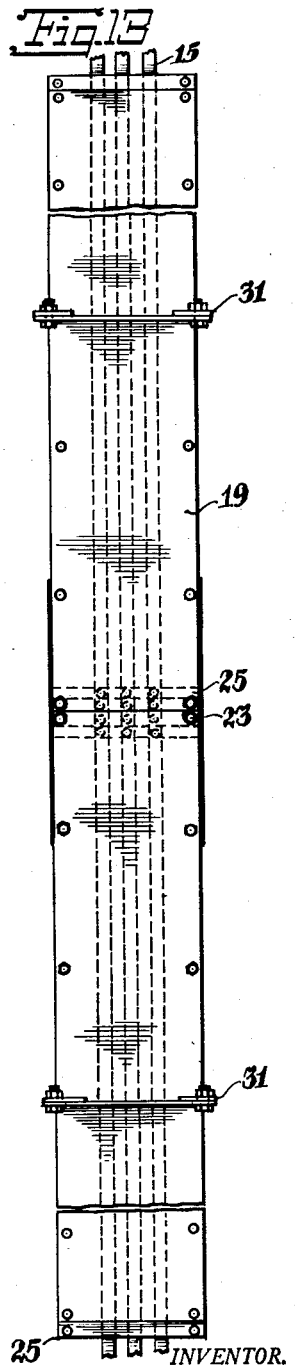
INVENTOR.
CHARLES E. BARKIS
BY
ATTORNEY Patented Sept. 18, 1951

2,568,480

UNITED STATES PATENT OFFICE 2,568,480

POWER DISTRIBUTION SYSTEM

Charles E. Barkis, San Francisco, Calif., assignor, by mesne assignments, to General Electric Company, a corporation of New York Application August 14, 1946, Serial No. 690,581

3 Claims. (Cl. 191—23)

My invention relates to overhead bus bar duct trolley systems especially those intended for installation in positions exposed to the action of the weather.

The main object is to provide apparatus which is capable of withstanding exposure to rain and dust as for instance in shipyards and other outdoor locations.

Another object is to provide apparatus capable of withstanding rough treatment.

Another object is to provide a trolley type of branch take-off which is effective.

Another object is to provide apparatus which can be readily inspected, adjusted and repaired.

For this purpose I provide a special form of duct which encloses the bus bars and the tracks which support trolley-like collectors carrying the brushes for engaging the bus bars and to which the branch conductors are attached. Side portions of the duct are removable to facilitate access to the collectors and to the bus bars. The collectors are specially constructed so as to facilitate installation, inspection and replacement.

The accompanying drawings and the following specification show and describe a preferred construction embodying the invention.

Fig. 1 is a cross-sectional view showing the construction of the bus bar duct embodying the invention and with a trolley take-off or collector in position.

Fig. 2 is a similar view showing the trolley collector in the position of insertion into or removal from the duct.

Fig. 3 is a perspective view on a smaller scale of the bus bar duct, parts being broken away.

Fig. 4 is a plan view of the trolley take-off or collector device.

Fig. 5 is a side view and section of the trolley take-off device.

Fig. 6 is a detail end view of the branch conductor clamping device.

Fig. 7 is a perspective view showing parts of the trolley frame and attached parts.

Fig. 8 is a fragmentary detail side view of one of the brush holders.

Fig. 9 is a cross-sectional view of a brush holder on the plane of line 9—9 of Fig. 8.

Fig. 10 is a plan view of the brush holder of Fig. 8.

Fig. 11 is a view of the underside of a duct, parts being broken away and showing a trolley collector in place.

Fig. 12 is an edge view of the same.

Fig. 13 is a top or plan view of the duct.

The bus bars 15, 15, 15 may be of any suitable construction and each is mounted on an insulating block 16 carried by a cross bar 17. These insulating blocks and cross bars are arranged at intervals along the length of the bus bars and are enclosed in the duct. The duct itself consists of side bars 18, 18 of Z-shaped section, a top plate 19 and flanged side covers 20, 20. The upper flange 21 of each Z-bar and the flange 22 of each side cover are secured together and to the cross bars 17 by bolts 23, 23. The edges of the top plate 19 may be flanged over at 24 to cover the ends of the cross bars and the edges of the flanges mentioned. As the duct will naturally be longer than any one of the top plate sections, I provide transverse splice bars 25 to connect the ends of adjacent sections of the top plates.

The Z-bars 18, 18 are made sufficiently strong so that their lower flanges 26, 26 may serve as tracks for the rollers or wheels 27, 27 of the collector or trolley take-off device. The side covers 20, 20 need not be as heavy or strong as the Z-bars but they do extend horizontally to form the bottom of the duct and are provided with spaced-apart flanges 28, 28 which thus provide a slot for the passage of the branch conductors 29 and the guard 29'. The side covers are formed in suitable lengths and at the locations where the joints in the bus bars occur I provide short cover sections 30 which are removable to facilitate access to the connection between the bus bars and to facilitate insertion and removal of the trolley collector as will be hereinafter described.

The duct may be supported at intervals throughout its length by means of suitable hangers 31, 31.

The trolley take-off or collecting device has angle bar sides 32, 32 constituting part of its frame and which are connected by transverse members 33 and 34. Transverse member 33 is detachably secured to the horizontal flanges of the opposite angle bars by bolts 35, 35 and member 34 is secured by pairs of bolts 36, 36. The conductor guard 29' is secured to the transverse member 34 and extends through the slot between the flanges 28, 28 of the cover members.

An insulating cross bar 37 is secured to the horizontal flanges of the angle bars by bolts 38, 38 and supports the brushes 39, 39, 39 which engage the under surface of the bus bars 15, 15, 15. Insulating barriers such as 40, 40 are mounted in slots 41, 41 in the bar 37 alongside of and between the brushes and their supports. Conductor bars or strips 42, 42 are secured by bolts 43 to the insulating cross bar 37 and on these bars are mounted the saddles 44, 44 which carry the brush holders 45, 45. The brush holders are arranged in pairs, each pair being supported by a pivot 46 and biased upwardly by a spring 47 to press the brushes against the bus bars. To limit the movement of each brush holder when the trolley collector is removed from the duct, I provide a headed stud 48 which is secured to the base of the saddle 44 and the brush holder is provided with a keyhole-shaped opening 49 to facilitate assembly and disassembly. Each brush 39 has a flexible lead 50 and a terminal piece 51 which is secured to the conductor bar 42 on which the brush is mounted.

On the end of each conductor bar 42 is detachably mounted an attachment lug 52 of suitable form to which one of the conductors 29 is secured. In order to hold the conductors in position adjacent the attachment lugs I provide clamping members 54 and 55 held together and secured to the transverse member 34 by bolts 56, 56'.

I also provide an insulating guard plate 57 which is removably secured to the cross bar 37 by screws 58.

From the foregoing it will be seen that the strain applied to the trolley collector when the conductors are pulled is taken up by the clamp on the transverse member 34 and not by the conductor bars 42. The brushes being mounted between the trolley rollers and being spring pressed are maintained in perfect contact with the bus bars.

The side bars 32, 32 with the rollers 27, and the transverse members 33 and 34 constitute the frame unit of the collector. The insulating cross bar 37 with the attached conductor strips 42, 42, 42 and the brush holders and brushes constitute the brush assembly unit which is detachably carried by the collector frame.

Access may be had to a trolley collector by removing the short covers 30, 30 whereupon, if desired, the guard plate 57 may be removed.

By this construction, it is possible when the short side covers 30, 30 are removed to remove the entire brush assembly as a unit from the collector frame. For this purpose, the conductor lugs 52, 52 are detached from the conductor bars 42 and the bolts 38, 38 removed so as to disconnect the cross bar 37 and the attached brushes from the side bars 32, 32.

If it is desired to inspect or repair the brushes or other parts of the collector, it is a simple matter to remove the entire collector. For this purpose, the bolts 35, 36 and 38 along one side of the collector which secure the transverse bars 33, 34 and 37 of the collector to the adjacent angle bar 32 are removed and the remainder of the collector tilted as shown in Fig. 2 whereupon it may be removed. If necessary, the angle bar at the left in Fig. 2 when thus detached may be moved longitudinally along the track 26 to provide more clearance.

The construction will thus be seen to be simple, rugged and protected to a maximum degree from interference or damage and yet capable of convenient inspection and repair.

The trolley construction is claimed in my application Serial Number 81,452 filed March 15, 1949.

I claim:

1. A distribution duct comprising a top plate, side members of substantially Z-shaped cross-section having feet secured to the edges of the top plate and providing inwardly projecting supporting tracks for the rollers of a trolley collector, means arranged at intervals along the top plate for supporting bus bars and cover sections having flanges secured to the edges of the top plate and extending beneath the top plate and the side members but leaving a slot for the passage of distribution conductors.

2. A distribution duct comprising a top plate, side bars of substantially Z-shaped cross-section having feet secured to the top plate and having inwardly projecting supporting tracks for the rollers of a trolley collector, cross bars arranged at intervals along the top plate supporting bus bars and cover sections removably secured to the edges of the top plate and to the side bars and extending beneath the top plate and the side bars but leaving a slot for the passage of flexible distribution conductors.

3. A distribution duct comprising a top plate, side bars of Z-shaped cross section secured to the top plate and having inwardly projecting supporting tracks for the rollers of a trolley collector, bus bars supported at intervals beneath the top plate and cover sections having flanges removably secured to the edges of the top plate and to the side bars and extending beneath the top plate and the side bars.

CHARLES E. BARKIS.

REFERENCES CITED

The following references are of record in the file of this patent:

UNITED STATES PATENTS

| Number | Name | Date |
| --- | --- | --- |
| 2,036,265 | Frank et al. | Apr. 7, 1936 |
| 2,304,924 | Jackson et al. | Dec. 15, 1942 |
| 2,322,640 | Jackson et al. | June 22, 1943 |
| 2,443,387 | Harris | June 15, 1948 |